May 27, 1930.   J. L. HUSAK   1,759,849
TIRE TOOL
Filed June 15, 1929
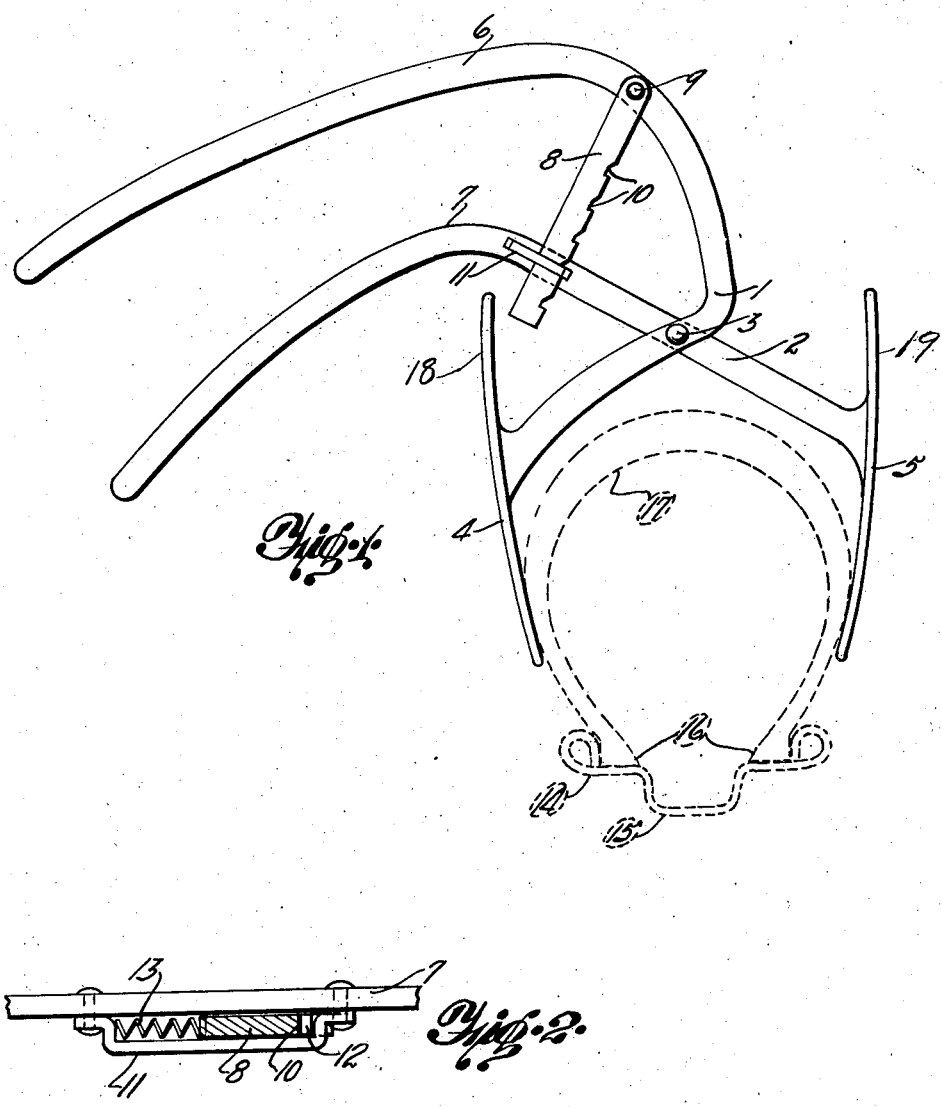
Inventor
Joseph L. Husak.
By Adam E. Fisher.
Attorney Patented May 27, 1930

1,759,849

UNITED STATES PATENT OFFICE

JOSEPH L. HUSAK, OF SCHUYLER, NEBRASKA

TIRE TOOL

Application filed June 15, 1929. Serial No. 371,112.

This invention relates to tire tools and more particularly to a tool adapted for use in the applying or removing of tires from drop center rims.

The main object is to provide a tool by the use of which a portion of the sides of a tire may be readily and easily compressed in order to allow the beads or inner edges of the tire to drop into the drop center in the rim.

Another object is the provision of a tool of this kind in a simple, cheap and durable form having a lock to hold the tire compressed while removing the same.

The foregoing and other objects together with means whereby the same may be carried into effect will best be understood from the following description of a preferred embodiment of the invention taken in connection with the accompanying drawing in which:

Figure 1 is an elevation of a tool constructed in accordance with the invention, showing the manner of using the same upon a tire, a section of the tire and its rim being shown in dotted lines.

Figure 2 is a detail sectional view through the latch showing the latch pin and spring.

Referring now more particularly to the drawing, the reference numerals 1 and 2 denote a pair of levers fulcrumed together at 3 and comprising the tire engaging jaws 4 and 5 and the handles 6 and 7. The said jaws 4 and 5 may be of any width desired as will be understood and preferably, though not necessarily, are arcuate in form with their concaved or tire engaging faces turned inwardly toward each other as shown. The handles 6 and 7 are curved outwardly and downwardly from their fulcrum point 3 in spaced relationship as shown in the drawing to permit the use of the device upon a tire beneath an automobile fender as will be understood. A latch 8 is pivoted at 9 to the handle 6 and is provided with a plurality of spaced, angularly cut notches 10 along one margin. The said latch 8 is slidably passed through a loop 11 secured to the other handle 7 and a latch pin 12, Figure 2, is provided in this loop to engage any one of the notches 10 to releasably secure the latch in an adjusted position. An expansion coil spring 13 is secured in the loop 11 and bears against the latch 8 to urge the same over against the latch pin 12 and so hold any of the notches 10 in engagement with the latch pin. It will be apparent that as the handles 6 and 7 are closed to close the jaws 4 and 5 one of the notches 10 will engage the pin 12 to automatically retain the handles in any adjusted position. To open the handles it is only necessary to pull the latch 8 out of engagement with the latch pin as will be understood.

The tool is particularly adaptable for use upon tires fitted upon drop center rims or wheels. In Figure 1 the numeral 14 denotes such a rim having a drop center 15 into which the beads or inner edges 16 of the tire 17 are dropped by compressing a segment of the side walls of the tire. This permits the other side of the tire diametrically opposite the point at which the tire is compressed to be swung off the rim and so allow the removal of the tire as will be understood. In the use of my improved tool for compressing the tire the jaws 4 and 5 are brought into engagement with the sides of the tire preferably upon the upwardly disposed portion of the tire and the handles 6 and 7 are then closed until the sides of the tire are compressed a sufficient amount. Since the tool may be locked in any adjusted position it allows the operator free use of both hands in removing the tire after the tool is once set upon the tire.

It will be noted that the jaws 4 and 5 are relatively short and are so proportioned that they engage only the bulge in the sides of the tire and do not extend inward over the tire to the rim thus allowing the tire to drop down into the drop center 15 of the rim as will be understood.

The extended ends 18 and 19 of the jaws 4 and 5 serve as auxiliary handles to assist the operator in pulling off the tire or casing 17; and the ends 18 and 19 would also serve as stops or rests for the handles 6 and 7.

While I have herein set forth a certain preferred embodiment of my invention it is understood that I may vary from the same in minor structural details, not departing from the spirit of the invention and within the scope of the appended claims.

I claim:

1. In a tire tool, a pair of levers fulcrumed together and formed at their operating ends into relatively short tire engaging jaws and at their opposite ends into relatively long and outwardly and downwardly curved handles, the said jaws having oppositely extended portions adapted to serve as auxiliary handles and as stops for the operating handles.

2. In a tire tool, a pair of levers fulcrumed together and formed at their operating ends into relatively short tire engaging jaws and at their opposite ends into relatively long and outwardly and downwardly curved handles, the said jaws having oppositely extended portions adapted to serve as auxiliary handles and as stops for the operating handles; and means for releasably locking the jaws in any set relation.

In testimony whereof I affix my signature.

JOSEPH L. HUSAK.